Feb. 16, 1965 C. D. NESTLERODE 3,170,141
FREQUENCY RESPONSIVE INTERROGATION SYSTEM HAVING A REPLY OSCILLATOR AT THE RECEIVER
Filed Dec. 21, 1960
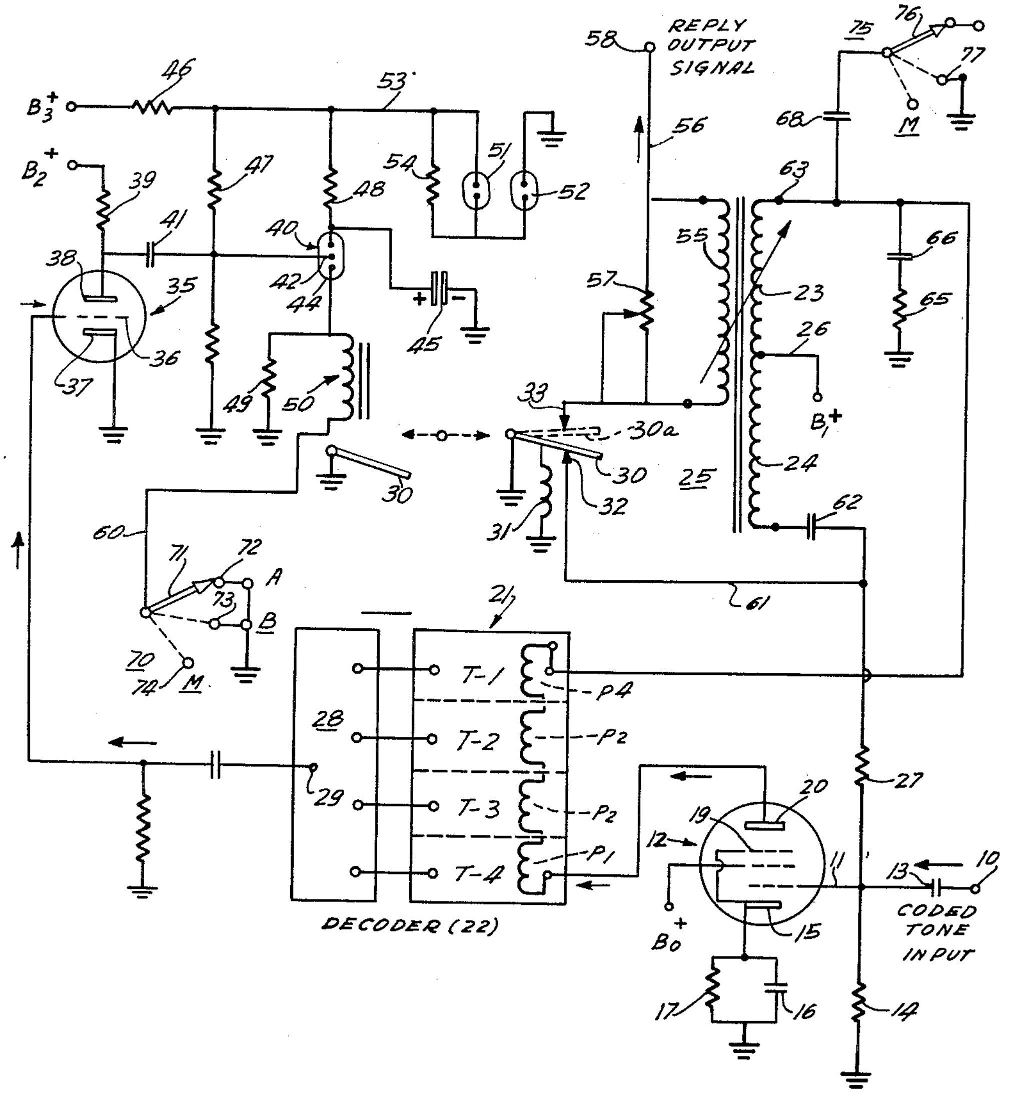
INVENTOR.
C. DALE NESTLERODE
BY
OSTROLENK, FABER, GERB & SOFFEN
ATTORNEYS 3,170,141
Patented Feb. 16, 1965

3,170,141

FREQUENCY RESPONSIVE INTERROGATION SYSTEM HAVING A REPLY OSCILLATOR AT THE RECEIVER

Clifford Dale Nestlerode, West Covina, Calif., assignor to Standard Kollsman Industries, Inc., Melrose Park, Ill., a corporation of Illinois Filed Dec. 21, 1960, Ser. No. 77,384
4 Claims. (Cl. 340—171)

This invention relates generally to electrical reply circuitry, and particularly to novel simplified reply circuits utilizing components of the associated interrogation circuits.

In remote interrogation systems, as to determine when subscriber receivers of a pay-television system are turned on to a fee program, successive bursts of coded tones are broadcast with the programs. Such interrogation bursts are arranged to not interfere with visual or aural reception. The receiver contains a decoder section responsive to the tones. The decoder generates a local signal or pulse upon reception of a preset tone code. Reference is made to copending patent application Serial No. 77,569 filed December 22, 1960, for "Remote Interrogation Decoding Circuitry," assigned to the assignee of this case.

The present invention is directed to provide foolproof simplified circuit arrangements to generate a predetermined signal when triggered by a decoder pulse, for transmission back to the central station. Such reply response is rapidly effected, and well completed prior to the transmission of the next subscriber code. The incorporation of relay actuation by the decoder response is herein combined with utilization of the decoder's drive amplifier to generate the reply signal. Economy of circuit components is realized therefrom.

It is among the objects of the present invention to provide novel reply circuitry for remote interrogation systems.

Another object is to provide economical, foolproof reply circuits of the type referred to.

A further object of the invention is to combine important circuit components of the interrogation decoder with the reply circuit for succesive operation.

These and other objects of the invention will become apparent in the description of an exemplary embodiment thereof, illustrated in the drawing wherein the sole figure is a circuit diagram thereof.

The interrogation coded tone signal is impressed at input terminal 10 to the grid electrode 11 of drive amplifier 12. An input R–C network 13, 14 is provided. The cathode 15 of pentode stage 12 is self-biased through the R–C elements 16, 17. The screen grid 18 of pentode 12 is suitably biased at $B_0$+. Tube 12 may be one section of a dual purpose tube for economy of space and cost. The suppressor grid 19 is tied to cathode 15. The anode 20 output components of stage 12 includes the tuned transformer section 21 of decoder 22 in series with the winding section 23 of the primary winding 23, 24 of reply oscillator transformer 25.

The tuned multi-stage transformer section 21 comprises four separately preset transformers T–1, T–2, T–3, T–4 that include individual primary windings *p*–1, *p*–2, *p*–3, *p*–4, indicated in dotted lines. The windings *p*–1 etc. are cascaded in series connection between anode 20 and the reply oscillator winding 23. Further details as to the circuits and operation of the decoder 22 are contained in the copending application referred to. The anode potential source $B_1$+ is connected to the common point 26 of windings 23, 24, and continues through winding 23 and transformers T–1 etc. in series to anode 20 of pentode stage 12.

With grounded relay armature 30 normally biased by spring 31 against back-contact 32, resistor 27 is connected in shunt with input resistor 14. Transformer 25 is thereby effectively out of circuit with the input of pentode stage 12. The inclusion of winding 23 in the tone decoder 21 anode circuit, accordingly does not interfere with the drive input (12) or the operation of the decoding circuit (21). The detector 28 of the decoder 22 is in circuit with each tuned transformer T–1 etc. Upon simultaneous preset tone code input at terminal 10, driver stage 12 activates tuned unit 21, and the detector creates a pulsed signal at its output terminal 29, as set forth in said patent application.

The output 29 of the decoder 22 is directly impressed upon the grid electrode 36 of triode amplifier stage 35. Cathode 37 is grounded; and anode 38 connects to potential source $B_2$+ through dropping resistor 39. The amplified pulse is coupled through capacitor 41 to the control electrode 42 of a cold-cathode neon-type thyratron 40. The anode 43 of the thyratron trigger tube 40 is supplied from potential source $B_3$+ through resistor network 46, 48, and is connected to ground by an electrolytic capacitor 45. A relay 50 has its solenoid winding connected to the cathode 44, and to control lead 60. A resistor 49 shunts relay 50 to ground, at the cathode 44.

An anode voltage regulator is provided to insure precise and accurate operation of the thyratron tube 40. Two neon bulbs 51, 52 are connected in series between the supply line 53 and ground, with a high ohmage resistor 54, as one megohm being shunted across the bulb 51. A pulse signal from decoder (22) output (29) impressed on triode stage 35, input 36, results in an amplified pulse to the control electrode 42 of thyratron 40. Discharge of the thyratron 40 results, and the solenoid winding of relay 50 is energized to attract the biased armature 30 to the indicated (upper) position 30*a*.

The electrolytic condenser 45 discharges through the thyratron 40 for a relatively long pulse for this purpose. A relay "on" pulse duration, made possible by the electrolytic condenser 45 action and circuit relation of 0.1 second is feasible, regardless of the shorter duration of the decoder input pulse signal at tube 35. In this way, a positive relay 50 action is assured, with an adequately long holding of the armature 30 in the "on" position 30*a* indicated in dotted lines at both relay 50 and in its actual circuit position between relay contacts 32, 33 at the oscillator transformer 25.

When the subscriber's coded tone interrogation signal appears at input terminal 10, its decoding results in a local pulse signal at stage 35 which in turn actuates relay 50. The armature 30 is thereupon directly moved into its forward contact position 30*a* for at least 0.1 second duration. At the forward position 30*a*, the contact 32 becomes ungrounded, and primary windings 23, 24 of oscillator transformer 25 become effective in the input circuit of pentode stage 12. Also, contact 33 becomes grounded, and the secondary winding 55 "reply" output placed in circuit condition for transmitting a reply signal through output lead 56. A potentiometer 57 in shunt across output winding 55 permits adjustment of the reply signal magnitude.

With lead 61 ungrounded at back-contact 32, the winding section 24 connects to grid electrode 11 through blocking condenser 62 and resistor 27. With terminal 63 of winding section 23 in circuit with anode 20 (through decoder unit 21), a low frequency oscillator circuit results. The local reply tone frequency is readily adjusted for by established means. The transformer 25 core may be of the E–I configuration for inductance variation; and an R–C tone control circuit 65, 66. Suitably reply tone frequencies are in the order of 1000 to 2000 cycles, being generated by the oscillator transformer 25 and pentode 12, upon suitable parameter adjustment. Such tone generation occurs during the interval when the relay (50) armature is in its actuated position 30*a*, and between interrogation coded signal bursts.

In operation for a pay-television automatic interrogation-reply system: The relay 50 is rendered effective for actuation by trigger circuit 40, 45 when its lead 60 is grounded through switch 70. Switch arm 71 is at ground when pay programs as A or B are switched-in at the receiver; arm 71 being suitably ganged to the selector or tuner (not shown). When connected in the stand-by "barker" or music channel M, the relay is ungrounded and ineffective to operate the reply transformer. Thus the armature 30 can be displaced to initiate a reply tone at output terminal 58 only when a pay program (A, B) is being played at the receiver.

The reply tone is desirably a different frequency for each pay program channel (A, B), in order that the central billing be properly effected; particularly if different rates apply. Such is readily provided through switch 75. For channel A, the condenser 68 in the switch arm 76 lead remains open circuited, and a 1500 cycle tone develops in the transformer 25 circuit, and fed to terminal 58. For program B, switch arm 76 is grounded through contact 77, connecting the suitable low tolerance condenser 68 in parallel across network 65, 66, to result in say a 1000 cycle reply note. For channel M no ground is requisite. The reply tones at output 58 may be transmitted directly to the central station through the coaxial cable system; or caused to modulate a particular carrier where desired.

Although this invention has been described with an exemplary circuit, modifications in its circuitry or application may be made, within the broader spirit and scope of the invention as set forth in the following claims.

I claim:

1. In combination an interrogating transmitter and a plurality of receivers connected thereto, each of said receivers being responsive to selected tone signals from said transmitter and operable to generate a reply tone signal, each of said receivers having an electron tube amplifier for receiving said interrogating signals and a thyratron tube dischargeable in response to the reception of said selected tone signals, a solenoid operated upon discharge of said thyratron tube, oscillator circuitry normally disconnected from said electron tube and switch means operable by said solenoid for connecting the oscillator circuitry to said electron tube whereby the electron tube functions as an oscillator to generate a reply tone.

2. In combination an interrogating transmitter and a plurality of receivers connected thereto as set forth in claim 1, wherein said oscillator circuitry includes first and second winding sections, said electron tube including anode, cathode and grid electrodes, said first winding section circuit connectable to one of said electrodes and said second winding section circuit connectable to another of said electrodes, said switch means when in its normal condition effectively defeating the connection of at least one of said winding sections to its respective electrode, said switch means when operated by said solenoid connecting said winding sections to their respective electrodes for converting said electron tube into operation as an oscillator.

3. In combination an interrogating transmitter and a plurality of receivers connected thereto as set forth in claim 1, further including circuit means selectively connectable to said oscillator means for changing the tone of said generated reply tone.

4. In combination an interrogating transmitter and a plurality of receivers connected thereto as set forth in claim 1, wherein said oscillator circuitry includes primary and secondary transformer windings, said electron tube including anode, cathode and grid electrodes, a decoder unit in circuit with the electrodes of said electron tube having a common anode output circuit with the primary transformer winding, said switch means including circuit connections to normally disable the operation of said oscillator circuitry with said electron tube, and for directly establishing the oscillator reply tone generation circuit mode with said electron tube upon the solenoid operation.

References Cited by the Examiner

UNITED STATES PATENTS

| | | | |
|---|---|---|---|
| 2,177,843 | 10/39 | Seeley. | |
| 2,419,487 | 4/47 | Dresser | 340—151 |
| 2,485,580 | 10/49 | Ferrar et al. | 340—171 |
| 2,531,416 | 11/50 | Ferrar | 340—171 |
| 2,757,368 | 7/56 | King et al. | 340—310 |
| 2,807,757 | 9/57 | Callinan | 331—172 |
| 2,864,943 | 12/58 | Schultz | 340—151 X |
| 2,913,711 | 11/59 | Polyzor. | |
| 2,941,161 | 6/60 | Scantlin | 331—172 |
| 3,022,492 | 2/62 | Kleist | 340—151 X |
| 3,058,095 | 10/62 | Reynolds | 340—310 X |

NEIL C. READ, *Primary Examiner.*

STEPHEN W. CAPELLI, *Examiner.*